Oct. 22, 1935.   W. P. LANGWORTHY   2,018,405
DYNAMO ELECTRIC MACHINE AND METHOD OF MAKING LAMINATIONS THEREFOR
Filed Jan. 22, 1934
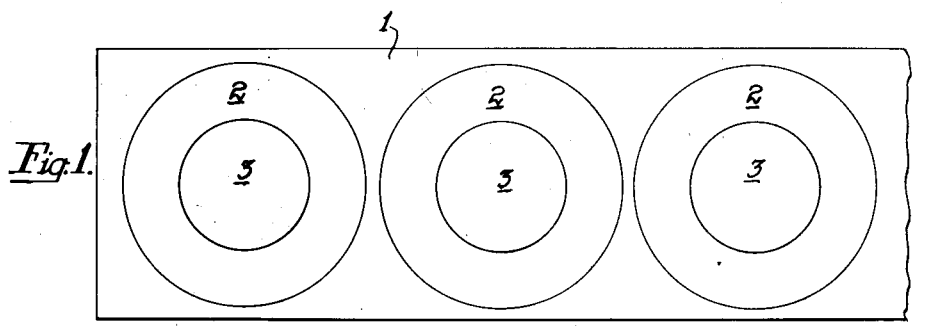
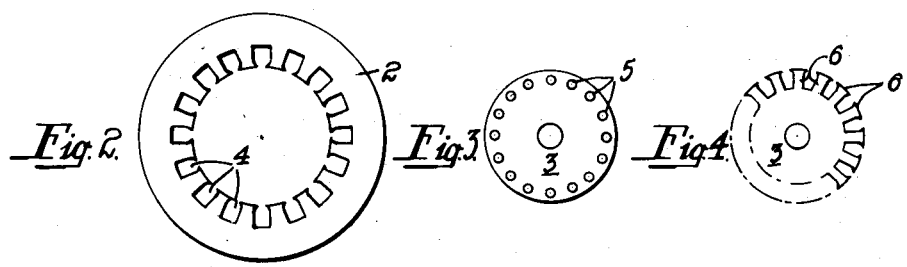
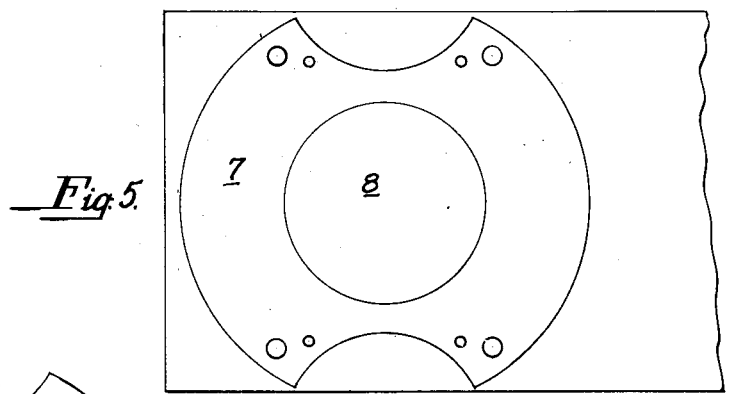
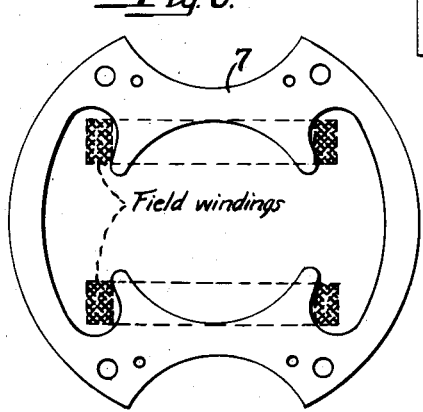
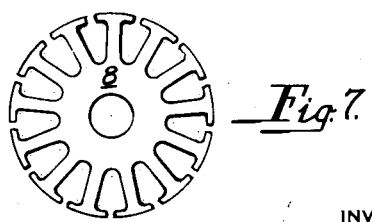
INVENTOR
William P. Langworthy
By Green & McCallister
His Attorneys Patented Oct. 22, 1935

2,018,405

UNITED STATES PATENT OFFICE 2,018,405

DYNAMO-ELECTRIC MACHINE AND METHOD OF MAKING LAMINATIONS THEREFOR

William P. Langworthy, Aspinwall, Pa., assignor to Allegheny Steel Company, Brackenridge, Pa., a corporation of Pennsylvania Application January 22, 1934, Serial No. 707,649

3 Claims. (Cl. 171—206)

This invention relates to electric machines, and more particularly to motors having rotor and stator elements composed of magnetizable laminations or punchings made from the same sheet of material but having different magnetic characteristics such as watt loss and permeability, and to the method of making the laminations or punchings for such machine elements.

An object of this invention is the provision of electric machines having rotor and stator elements made up of laminations punched from the same sheet of magnetic material but differently treated, according to the type of machine in which they are to be embodied, so that the magnetic characteristics of such elements will produce in each type of machine the optimum in speed torque characteristics.

Another object of the invention is the provision of a method of making punchings or laminations for rotor and stator elements of electric machines that will make possible the manufacture of such elements at reduced cost and at the same time improve the operating characteristics of such machines.

Other objects of the invention will, in part, be apparent and will, in part, be obvious from the following description taken in conjunction with the accompanying drawing, in which:

Figure 1 is a plan view of a portion of a sheet of magnetic material from which laminations or punchings for the rotor and stator elements of an electric machine have been blanked;

Fig. 2 is a view of a stator punching blanked from the sheet of Fig. 1 after the coil slots have been formed therein.

Fig. 3 is a view of a rotor punching blanked from the sheet shown in Fig. 1 after it has been pierced to provide openings for the rotor bars which form the squirrel cage of an induction motor;

Fig. 4 is a view of a rotor punching blanked from the sheet shown in Fig. 1 after the coil slots have been formed therein;

Fig. 5 is a plan view of a portion of a sheet of magnetic material from which rotor and stator punchings for a different type of motor have been blanked;

Fig. 6 is a view of the stator punchings blanked from the sheet of Fig. 5 after it has been trimmed for use in a two-pole motor, the field coil windings being indicated in broken lines; and Fig. 7 is a view of the rotor punching blanked from the sheet of Fig. 5 after the coil winding slots have been formed therein.

Throughout the drawing and the specification like reference characters indicate like parts.

This invention is primarily directed to that field of the electric machine art having to do with the design and construction of small motors and particularly to the so-called fractional horsepower type of motor. The invention includes both the construction of motors in which the armature and stator punchings or laminations have different magnetic properties or characteristics though made from material of the same gauge and metallurgical composition, and the method of making magnetic rotor and stator elements having different magnetic characteristics though made from sheet material of the same gauge and composition.

In the construction of electric motors, the magnetic circuits thereof, which are formed by the rotor and stator elements, are designed to give the optimum in motor performance. The measure or standard of such performance, for a given type of motor, is usually determined from its speed-torque characteristic, the speed torque characteristic being governed by the magnetic characteristics of the rotor and stator elements.

The small motor class above-mentioned, embraces primarily two types; the induction and the commutator types. Induction motors are either of the wound rotor or the squirrel cage type, while commutator motors are either of the series or shunt field type.

In the induction type of motor, high starting torque is desirable because it makes possible quick acceleration under load and high running speeds with relatively low slip at such speeds. In the commutator type of motor, high maximum speed is desirable.

To obtain high starting torque in the induction type of motor, a strong magnetic field is necessary and to obtain a strong magnetic field, the magnetic laminations or punchings which make up the stator, should be characterized by high permeability and low watt loss, while the laminations or punchings which make up the rotor of a motor of this type should be characterized by low permeability and high watt loss.

In the commutator type of motor, the magnetic characteristics of the stator and rotor should be the reverse of the characteristics of the rotor and stator of an induction motor. To obtain high maximum speed in the commutator type of motor, a weak field is essential and to obtain a weak field the magnetic characteristics of the laminations which make up the stator should be characterized by high watt loss and low permeability, while the magnetic characteristics of the laminations or punchings of the rotor should be characterized by low watt loss and high permeability.

Thus, from the above it will be apparent that for either type of motor, the magnetic characteristics of the stator and rotor should be different. Heretofore different magnetic characteristics in the rotor and stator have been obtained by making the rotor and stator punchings or laminations from different kinds of magnetic material, but this has resulted in a waste of material as will be apparent as the description of this invention progresses.

In accordance with this invention, the rotor and stator laminations are blanked from the same strip or sheet of magnetic material such as silicon steel, and before such sheet has been annealed; that is the sheet material is blanked before any part of it has been annealed. When the rotor and stator elements are thus blanked, the center part of each stator lamination forms a rotor lamination. After the rotor and stator laminations have been thus blanked, the conductor or coil slots are punched therein. The laminations may be separately trimmed to provide the desired air gap between the rotor and stator, or after the rotor and stator elements have been assembled, these elements may be ground to provide the proper air gap.

When the punchings have been finally trimmed, then either the stator punchings or the rotor punchings, but not both, are treated to improve the magnetic properties thereof, that is to increase the permeability and decrease the watt loss, depending on the type of motor in which the punchings are to be used. Such treatment is usually an annealing treatment.

If the motor is of the type requiring a stator having high permeability and low watt loss, and a rotor having low permeability and high watt loss, the stator punchings are annealed, but the rotor punchings are not, the rotor punchings being used in the condition they are in when finished in the rolling mill, commonly referred to as hot rolled finished.

If the motor is of a type requiring a rotor having high permeability and low watt loss, then the rotor punchings are annealed and the stator punchings are used without heat treatment and in the condition they are in when finished in the rolling mill.

The above procedure has several apparent advantages, in that the material is punched while in a hard or half hard condition, only a small amount of the magnetic material going into a motor is subjected to the expense of annealing or heat treatment, no material which is usable in the motor is wasted, and lastly, the rotor and stator magnetic circuits having different magnetic characteristics may be obtained from the same sheet material, that is, material of the same gauge and quality, at lower cost to the manufacturer. Furthermore, this procedure relieves the motor manufacturer of the trouble and expense incident to the making and heat treatment of these punchings.

In Fig. 1 of the drawing, a sheet or strip 1 of magnetic material is illustrated from which the stator and rotor, blanks 2 and 3 are punched. The sheet or strip from which these punchings are blanked is preferably unannealed, and in the condition it comes from the mill, for when unannealed, its hardness is such that the blanking may be accomplished without excess formation of burrs at the edges of the stator and rotor blanks. After these blanks have been punched from the sheet of material, the teeth which define the coil slots 4 in the stator punchings are formed as indicated in Fig. 3. The rotor blanks are then either pierced as in Fig. 3, to provide a plurality of apertures or holes 5 along the periphery thereof for the reception of the bars (not shown) which are connected at their opposite ends to form the rotor winding usually referred to as a squirrel cage winding; or these rotor blanks are formed with teeth 6 which define the coil slots in case these punchings are to be used in a commutator type of motor or in an induction motor having a wound rotor.

By making the rotor and stator punchings in this fashion, the center part of the rotor is conserved and used to make up the rotor laminations which results in a saving of material.

The particular procedure above described is merely illustrative, and it is to be understood that the operations of fabricating the rotor and stator punchings may be varied in many ways. For example, these operations may consist in first piercing the rotor and stator slots in the same or successive steps, followed by a blanking operation to separate the rotor and stator laminae from each other and from the sheet or strip stock. These operations may be carried out in separate sequential steps, or all steps may be performed in one press at one time, or in separate presses with separate dies. Regardless of the procedure employed, the rotor and stator laminations are made from the same unannealed stock.

After the rotor and stator punchings have been fabricated, either the stator or rotor punchings, but not both, are heat treated or annealed to improve the magnetic properties thereof, such as watt loss and permeability, depending upon the type of motor in which they are to be used.

For example, if the punchings are for an induction motor, then the stator punchings are heat treated to increase the permeability and to decrease the watt loss thereof; while the rotor punchings are given no heat treatment, or if any treatment is given, it is of a nature to further impair the magnetic properties, that is, to further reduce its permeability and increase its watt loss. Since only the finished stator punchings are given heat treatment as above described, only a relatively small amount of material is thus treated. Since the volume of metal in the stator punchings, when finished, is relatively small, compared with a pile of sheets in a mill annealing pot, greater uniformity in heat treatment is accomplished.

In the fabrication of the rotor and stator punchings for a series type of motor, the stator punchings are either not given any heat treatment, or are given a treatment which impairs its magnetic properties; that is, a treatment which further reduces its permeability and increases its watt loss, while the stator punchings are heat treated or annealed to increase the permeability and to reduce the watt loss thereof.

The procedure depicted by Figs. 5 to 7, inclusive, has to do with the formation of the rotor and stator punchings for the so-called two-pole type of motor. As in the procedure depicted by Figs. 1 to 4, inclusive, the sheet material from which the rotor and stator blanks 7 and 8 are punched is preferably unannealed and in the condition it is in when finished in the rolling mill, for in this form the magnetic properties are, from the standpoint of permeability and watt loss, the poorest. The stator blanks are then trimmed to a shape such as illustrated in Fig. 6. The rotor blanks are also trimmed and formed with coil slots, if the punchings are to be used in a commutator-type of motor, or the rotor punchings are pierced in the fashion indicated in Fig. 3, if they are to be used in the induction-type of motor.

If the stator and rotor punchings illustrated in Figs. 6 and 7 are to be employed in the induction-type of motor, then only the stator punchings are heat treated or annealed to improve the magnetic properties thereof, while the rotor punchings are either not heat treated or annealed, or treated to further impair the magnetic properties thereof. If the stator and rotor punchings of Figs. 6 and 7 are to be employed in a series-type of motor, then only the rotor punchings are heat treated to improve or increase the permeability thereof and to decrease the watt loss, and the stator punchings are either not treated at all, or if treated, the treatment is of a nature to impair their magnetic properties.

From the above description, it will be apparent that in the production of rotor and stator punchings of the class above mentioned, that no material is wasted except that which is punched out to form the coil slots or the bar slots, and that only so much of the material is heat treated as will give the desired operating characteristics in the particular motor in which they are assembled. By this procedure, the motor and stator elements of an electric motor may be made from the same sheet material, that is, material of the same gauge and metallurgical composition, and, by selective treatment, be given different magnetic characteristics according to the type of motor and the performance that such motor must deliver.

Having thus described my invention, what I claim as new and desire to secure by Letters Patent is:—

1. The method of making rotor and stator punchings or laminations for electric machines that consists in starting with a sheet or strip of unannealed magnetic material, making the stator and rotor laminae from the body of the sheet or strip, then in heat treating the laminae for one only of said machine elements, so that when said laminae are assembled in a machine one or the other of said elements will have high permeability and low watt loss and the element having the untreated laminae will have low permeability and high watt loss.

2. The method of making punchings or laminae for the rotor and stator elements of electric machines that consists in fabricating such laminae from the same sheet or strip of unannealed magnetic material, and then in annealing only the rotor or the stator laminae, so that when said laminae are assembled in said machine elements, one of said elements will be characterized by higher permeability and lower watt loss than the other.

3. The method of making punchings or laminae for the rotor and stator elements of electric machines that consists in fabricating such laminae from the same sheet or strip of unannealed magnetic material, and then in separately and differently treating the rotor and stator laminae so that when said laminae are assembled in said machine elements, one of said elements will be characterized by higher permeability and lower watt loss than the other.

WILLIAM P. LANGWORTHY.